United States Patent [19]

Taniguchi et al.

[11] Patent Number: 4,963,417
[45] Date of Patent: Oct. 16, 1990

[54] PRESSURE-SENSITIVE TABLET

[75] Inventors: Takashi Taniguchi, Yaso; Shoichi Kurasaki, Kouga; Koichiro Oka, Ibaraki, all of Japan

[73] Assignee: Toray Industries, Inc., Tokyo, Japan

[21] Appl. No.: 214,438

[22] Filed: Jul. 1, 1988

[30] Foreign Application Priority Data

Jul. 3, 1987 [JP] Japan ............................ 62-167388
Nov. 5, 1987 [JP] Japan ............................ 62-280105
Feb. 24, 1988 [JP] Japan ............................ 63-43083

[51] Int. Cl.$^5$ ........................ B32B 5/16; G08C 21/00
[52] U.S. Cl. .................................. 428/327; 178/18; 428/323
[58] Field of Search ............................ 178/18, 19, 20; 428/327; 340/706

[56] References Cited

U.S. PATENT DOCUMENTS 3,911,215 10/1975 Hurst et al. ........................... 178/18
4,220,815 9/1980 Gibson et al. ......................... 178/18
4,707,570 11/1987 Ide et al. .............................. 178/18

*Primary Examiner*—George F. Lesmes
*Assistant Examiner*—Christopher Brown
*Attorney, Agent, or Firm*—Birch, Stewart, Kolasch & Birch

[57] ABSTRACT

A pressure-sensitive tablet having desired sensitivity, excellent durability, and a good appearance. The pressure-sensitive tablet comprises an electro-conductive substrate; deformable insulative particles with an average diameter of 0.1 μm to 100 μm, which are distributed on the substrate and an electron-conductive film superimposed on the deformable particles.

18 Claims, 2 Drawing Sheets

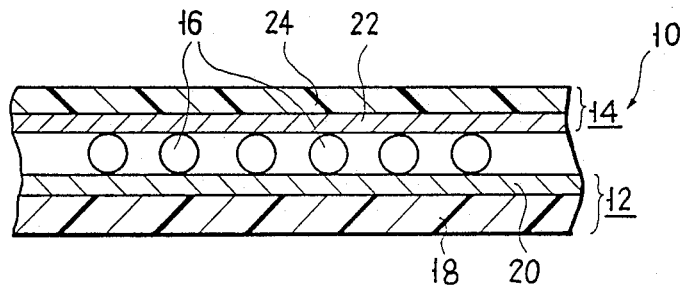
F I G. 1.
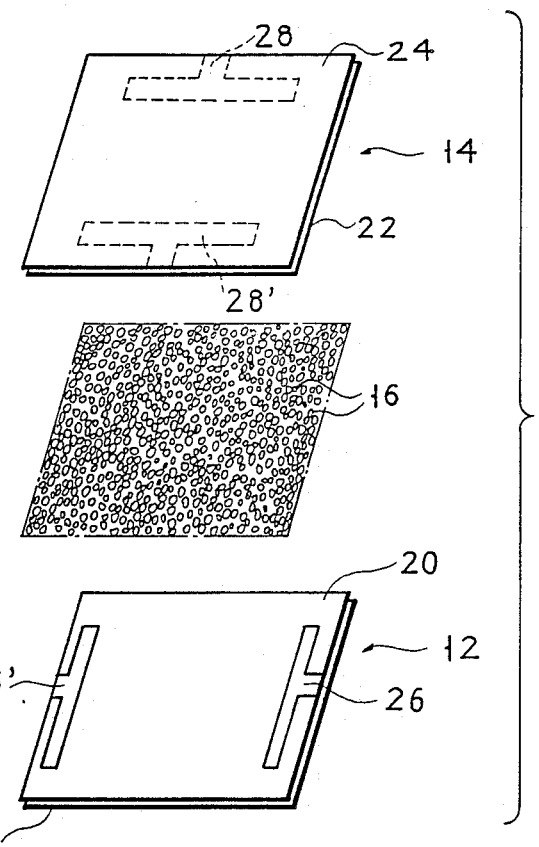
F I G. 2

PRESSURE-SENSITIVE TABLET

BACKGROUND OF THE INVENTION

I. Field of the Invention

The present invention relates to an image-inputting element, so called pressure-sensitive tablet. The pressure-sensitive tablet is used as a part of an image-inputting device of communication equipment.

II. Description of the Related Art

The pressure-sensitive tablets are elements used for inputting images at positions touched by a finger or a writing tool, such as a ball-point pen or pencil. Conventional pressure-sensitive tablets have a laminated structure comprising an electro-conductive substrate, an electro-conductive film superposed on the substrate, and a spacer interposed therebetween. The spacer is usually in the form of particles or granules, and electrodes are disposed on the film and the substrate. The electro-conductive film and the electro-conductive substrate are normally insulated by the spacer. Upon pressing the electro-conductive film with a finger or a writing tool, the pressed portion of the film is deformed to contact the electro-conductive substrate. Thus, only the pressed portion is made electro-conductive. The position of the pressed portion, i.e., the portion which became electro-conductive is calculated from the relationship between the resistance and the distance from the electro-conductive portion to the electrodes. Since the pressure-sensitive tablets are strong against outer noise, simple and can be compact, they are now widely used in, for example, computerized image-inputting processors, automatic teller machines and the like.

Typical conventional pressure-sensitive tablets are the so called dot-matrix type. That is, the spacer of the tablets is in the form of particles of cylindrical shape having a diameter of, e.g., 150 μm and a length of, e.g., 200 μm. At least one of the upper and lower surfaces of the cylinder is fixed to the electro-conductive film or the electro-conductive substrate, respectively. Since the particles are relatively large, they can be seen and they can be felt when the film is touched by a finger. Thus, the outer appearance of the tablets is bad and they produce a bad feeling on the finger when touching the tablet.

To overcome these drawbacks, Japanese Patent Disclosure (Kokai) No. 188726/84 discloses a tablet in which the spacer is in the form of a rubber sheet containing short and, fine metal filaments embedded therein in parallel with the thickness direction of the rubber sheet. When the film is pressed, the edges of the filament are made to contact the electro-conductive film and the substrate to make the pressed portion electro-conductive. However, this tablet has a drawback in that the durability is low because the edges of the metal filaments damage the electro-conductive film and the substrate.

U.S. Pat. No. 3,911,215 discloses a tablet in which the spacer is in the form of particles having truncated spherical shape. The particles are made of a material such as undeformable epoxy. However, since the particles do not deform, the film and the substrate are damaged by the particles, so that the durability, of the tablet is low. Further, since the particles do not deform, if a point of the film very close to a particle is pressed with a sharp object such as a ball-point pen, the film will not contact the electro-conductive substrate because the particle prevents such contact. Therefore, for example, if a circle line is written, the line is jagged by the existence of the particles, and thus the sensitivity is low.

Further, the resistance of the electro-conductive film of the conventional tablets gradually changes with time, especially when they are used under the sunlight or under a strong fluorescent lamp. As a result, the pressed portion calculated by the computer, shifts from the actual portion pressed.

SUMMARY OF THE INVENTION

Accordingly, an object of the present invention is to provide a pressure-sensitive tablet having excellent durability and sensitivity, a good outer appearance and does not produce a bad feeling to the finger when touching the tablet.

Another object of the present invention is to provide a pressure-sensitive tablet with high reliability, in which the resistance does not substantially change with time.

The present invention provides a pressure-sensitive tablet comprising an electro-conductive substrate; deformable insulative particles with an average diameter of 0.1 μm to 100 μm, which are distributed on the substrate; and an electro-conductive film superimposed on the deformable particles.

The present invention also provides a pressure-sensitive tablet of the type mentioned above, which employs an electro-conductive film having an UV light-cutoff property or an UV light-cutoff film provided on the electro-conductive film.

According to the pressure-sensitive tablet of the present invention, since the particles serving as the spacer are deformable, the damage to the electro-conductive film and the electro-conductive substrate produced by the particles is much smaller than the conventional tablets, so that the durability of the tablet of the present invention is very high. Since the deformable particles are small, unlike those of the dot-matrix type, the particles do not spoil the appearance of the tablet and do not produce a bad feeling to the finger when touching the tablet. Further, since the particles are deformable, if a point of the film very close to a particle is pressed, by virtue of the deformation of the particle, the point of the film can contact the electro-conductive substrate. Therefore, if a circular line is drawn, the line will not be jagged very much, and thus the sensitivity of the tablet is high.

The present inventors have found that what changes the resistance is the UV light. Thus, according to a preferred mode of the present invention, which employs an electro-conductive film having an UV light-cutoff property or an UV light-cutoff film provided on the electro-conductive film, the change in the resistance with time is substantially eliminated, Therefore, the tablet can be reliably used under sunlight or a strong fluorescent lamp, so that the reliability of the tablet is promoted.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a schematic partial sectional view of a preferred embodiment of the pressure-sensitive tablet of the present invention;

FIG. 2 is a schematic exploded perspective view of the pressure-sensitive tablet shown in FIG. 1;

DETAILED DESCRIPTION OF THE PREFERRED EMBODIMENTS

Figure 3:
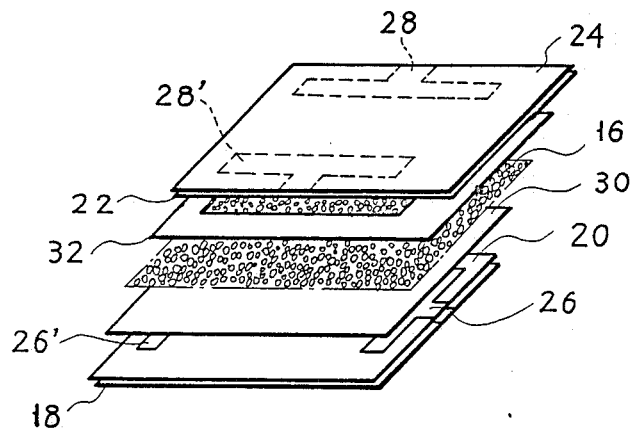
FIG. 3 is a schematic exploded perspective view of a pressure-sensitive tablet of another preferred embodiment of the present invention.

A fundamental laminated structure of the preferred embodiment of the pressure-sensitive tablet of the present invention is schematically illustrated in FIG. 1. The pressure-sensitive tablet generally denoted by the reference numeral 10 comprises an electro-conductive substrate generally denoted by the reference numeral 12, deformable insulative particles 16 and an electro-conductive film generally denoted by the reference numeral 14.

Although the substrate 12 may be a single conductive substrate, the substrate 12 may preferably comprise, as shown in FIG. 1, an insulative base substrate 18 and an electro-conductive membrane 20 laminated thereon. The base substrate 18 may be any plate or film such as a plastic film, plastic plate or an inorganic glass plate. Preferred examples of the resins constituting the base substrate include polyethersulfones, polyesters, polyacrylic resins, polycarbonates and poly(4-methyl-1-pentene). Among these, in view of the strength and the transparency, polyethersulfones and polyesters are especially preferred for constituting the film, and polyacrylic resins and polycarbonates are especially preferred for the plastic plate.

The electro-conductive membrane 12 may be made of a metal such as gold, paladium and chromium, or a metal oxide such as indium oxide and tin oxide. Such a membrane may be formed by a conventional technique such as vapor deposition, sputtering and application of a solution. In view of the electro-conductivity and transparency, gold, tin oxide and indium oxide membranes formed by the sputtering method, thermal chemical deposition method or vacuum deposition method are especially preferred. The electro-conductive membrane 12 preferably has a surface resistance of $1 \times 10^0$ $\Omega/\square$ to $5 \times 10^3$ $\Omega/\square$. The structure of the substrate 12 per se as well as the manufacturing method thereof are well-known in the art.

On the substrate 12, insulative particles 16 acting as a spacer are fixed on the substrate 12. The average particle size of the particles is 0.1–100 $\mu$m. The particles 16 are deformable, i.e., the particles 16 are elastically deformed when the electro-conductive film 14 is pressed with a finger, a writing tool or the like. The particles 16 preferably have a deformability of not less than 10%, more preferably not less than 15%. The deformability D (%) is expressed by the following formula [A]:

$$D (\%) = \frac{(L_0 - L)}{L_0} \times 100 \quad [A]$$

(wherein D means the deformability of the resin constituting the particles, $L_0$ means thickness of a block made of the resin when no pressure is applied to the block, and L means thickness of the block to which a pressure of 20 kg/cm² is applied.) In view of the durability, the particles 16 may preferably be deformed without destroying the particles and returned to substantially their original shape upon removing the pressure, this cycle being capable of being repeated many times. It should be noted, however, that non-deformable particles may also be co-employed together with the deformable particles in an the amount which would not adversely affect the durability of the tablet. In this case, it is preferred that the percentage of the deformable particles in the total amount of the particles be at least 40% by weight.

It is preferred that the particles 16 be distributed as uniform as possible. The particles 16 are preferably fixed to the electro-conductive substrate 12 or to the electro-conductive film 14 or both.

By appropriately selecting the average particle size, particles-substrate area ratio and the population density (number of particles per unit area of the substrate) of the particles, tablets having varying pressure sensitivity may be obtained. More particularly, by appropriately selecting these factors, those which can sense even weak pressure such as that given by unintentional touch with the palm, elbow or the like, those which cannot sense weak pressure, but can sense the medium pressure such as produced by intentional touch with a finger, and those which can sense only strong pressure such as produced by writing with a ball-point pen or pencil may be obtained. The term "particles-substrate area ratio" means the ratio of the apparent particle area (number of particles existing on a unit area of the substrate multiplied by the maximum sectional area of the particles) to the unit area of the substrate. The particles-substrate area ratio is measured by a well-known method using a commercially available image analyzer or a microscope, and the population density may be measured using a micro guage.

If the average particle size of the particles 16 is 1.5–40 $\mu$m, the particles-substrate area ratio is $2 \times 10^{-3}$ to $15 \times 10^{-3}$, and if the population density is 4,100 to 50,000 particles per cm², the tablet can sense only strong pressure such as produced by writing with a normal writing tools such as a ball-point pen, felt pen or pencil and cannot sense the medium pressure such as given by pressing with a finger or with normal force. Thus, this tablet has an excellent reliability when used as an image-inputting device wherein the image is inputted with a writing tool since the inadvertent touching with a palm or a fist is not inputted. This tablet also excells in transparency.

If the average particle size of the particles 16 is 7.0–100 $\mu$m, the particles-substrate area ratio is $0.5 \times 10^{-3}$ to $6.5 \times 10^{-3}$, and if the population density is 200 to 4,000 particles per cm², the tablet can sense not only strong pressure but also the medium pressure such as produced by intentional touching with a finger. However, this tablet cannot sense the weak pressure such as given by an unintentional touch with a finger, palm, elbow or the like. Thus, this tablet has excellent reliability when used as an image-inputting device wherein the image is inputted with a writing tool or finger since the unintentional touching with a palm or a fist is not inputted. This tablet also excells in transparency.

If the average particle size of the particles 16 is 1.0–50 $\mu$m, the particles-substrate area ratio is $1 \times 10^{-4}$ to $10 \times 10^{-3}$, and if the population density is 200 to 4,000 particles per cm², the tablet can sense not only the strong pressure and medium pressure, but also the weak pressure such as produced by unintentional touching with a finger, palm, elbow or the like. Thus, this tablet has excellent sensitivity. This tablet is also excellent in transparency.

In view of the excellent insulation and the ease of attaining uniform distribution, the particles 16 are preferably substantially spherical.

A number of polymers having the above-mentioned deformability of not less than 10% are known and commercially available. A preferred group of the polymers which may be employed for constituting the insulative deformable particles are thermoplastic resins such as polyamide resins, polyester resins, ethyl cellulose, ethylene-vinyl acetate copolymers, vinyl acetate resins and derivatives thereof, polystyrenes and copolymers thereof, acrylic rubbers such as butyl methacrylic resins and copolymers thereof, polyisobutylene and polypropylene. These may be employed individually or in combination. Further, a thermosetting resin may be blended.

Another preferred group of materials for constituting the deformable particles are mixtures of a thermosetting resin and an acrylic rubber. In view of the adhesiveness, the particles may preferably comprise 30–95% by weight of the thermosetting resin component and 5–70% by weight of the rubber component, more preferably 40–90% by weight of the thermosetting resin component and 10 to 60% by weight of the rubber component. If the content of the thermosetting resin component is less than 30% by weight, the particles tend to be undesirably soft and the adhesiveness tends to be reduced. On the other hand, if the content of the rubber component is more than 95% by weight, the rubbery property given by the rubber component may not be exhibited. Preferred examples of the thermosetting resin include epoxy resins and phenol resins. In cases where an epoxy resin is employed as the thermosetting resin, the particles preferably contain 40–90% by weight of the epoxy resin component and 10–60% by weight of the rubber component, more preferably 50–80% by weight of the epoxy resin component and 20–50% by weight of the rubber component. It is preferred that the acrylic rubber and the epoxy resin have the same active groups such as epoxy groups or glycidyl groups because the thermosetting of the two components can occur simultaneously. Further, those acrylic rubbers having active groups which can react with the thermosetting resin are also preferred. The thermosetting resin and the acrylic rubber may be miscible or immiscible in each other. Even in cases where the two components are immiscible and phase separation occurs, in view of the uniformity of the composition of different particles, it is preferred that the two components be miscible, at least before the formation of the particles.

Still another preferred group of the materials for constituting the insulative deformable particles are deformable epoxy resins and thermo-stable phenol resins. Preferred deformable epoxy resin particles are those which can act as an adhesive. More particularly, spherical particle adhesives comprising epoxy resins as the major component and a potential curing agent are most preferred. These particle adhesives are preferred because they can be fixed to the electro-conductive substrate 12 or to the electro-conductive film 14 without using a separate adhesive. To promote the adhesiveness of the particles, it is useful to heat-cure the particles after applying them to the substrate or film. By so doing, the particles are adhered to the substrate or the film semi-permanently, so that the stable inputting operation may be assured. Such an epoxy resin-based particle adhesive is well-known in the art and is commercially available from Toray Industries, Inc., Tokyo, Japan, under the tradename of "Torepearl".

In a preferred mode of the present invention,, the particles 16 are spherical and fixed to the substrate 12 or to the film 14 at substantially its single contact point as shown in FIG. 1. That is, the particles 16 contact the substrate 12 at a single point and are fixed thereto at this contact point. This configuration contributes not only to a higher degree of insulation, but also to a greater deformation of the particles when pressure is applied.

The particles may be fixed to the substrate 12 or the film 14 by using an adhesive. Alternatively, if the particles per se are adhesive or show an adhesive property when heated, the particles may be fixed to the substrate or to the film by heating.

The particles 16 are covered with the electro-conductive film 14. Although the electro-conductive film 14 may be a single conductive film, the electro-conductive film 14 may be preferably comprise a base film 24 and an electro-conductive membrane 22 as shown in FIG. 1. As to the constitution and the manufacturing method of the film 14, the same description as stated earlier for the electro-conductive substrate 12 may be equally applied except that the base film is a film and not a plate. The electro-conductive film 14 per se and the manufacturing process thereof are well-known in the art.

FIG. 2 is an exploded schematic perspective view of the pressure-sensitive tablet shown in FIG. 1. As shown in FIG. 2, the substrate 12 and the film 14 have electrodes 26, 26' and 28, 28', respectively. The electrodes may be metal foil and can be adhered to the substrate or to the film via an electro-conductive adhesive. The electrodes may usually be in the form of elongated rectangles disposed along the opposite sides of the substrate or the film. In another preferred mode, four elongated rectangular metal foil electrodes are provided on one of the substrate and the film, and only one electrode is provided on the other. In this case, the electro-conductive membrane from which only one electrode is provided preferably has a high electro-conductivity of not less than 10 times, more preferably not less than 100 times that of the electro-conductive membrane on which four electrodes are provided. In this case, the two pairs of facing electrodes alternately serves to read the coordinates.

The pressure-sensitive tablet of the present invention may be incorporated in a circuit for detecting the position of the tablet pressed. The pressed position may be determined based on the resistance between the pressed portion and the electrode and the distance therebetween. Such a circuit is well-known in the art and is described, for example, in "Report of Electro-Communication Society" IE79-17, May, 1975.

Although the inputting operation can be conducted without any problem even if the tablet is opaque, in many cases, it is desired that the tablet be transparent, since a transparent tablet can be overlaid on a cathode ray tube display without disturbing the image of the display and so the input can be conducted directly to the display while seeing the display. In this case, the overall light transmittance of the tablet is preferably not less than 60%. Since the particles 16 employed in the present invention are very small and cannot be seen with naked eye, the transparency of the tablet is substantially not degraded by the particles.

Another preferred embodiment of the pressure-sensitive tablet of the present invention is shown in FIG. 3. This embodiment has basically the same structure as the embodiment shown in FIGS. 1 and 2, and the same parts are denoted by the same reference numerals. The tablet of this embodiment has an electro-conductive coating 30 between the electro-conductive membrane 20 and the particles 16. The electro-conductive coating 30 interposed promotes the durability of the tablet. The coating 30 comprises electro-conductive particles contained in a vehicle. Preferred examples of the electro-conductive particles include indium/tin oxide and antimony-doped tin oxide. Preferred examples of the vehicle may include various organic and inorganic substances and thermoplastic and thermosetting substances, such as epoxy resins, acrylic resins, butadiene, butyral, polyester copolymers and low melting glass. Among these, epoxy resins, especially silicone-modified epoxy resins are especially preferred. These compositions may be employed individually or in combination. As the silicone-modified epoxy resins, those represented by the following formula [B]:

(wherein R represents $C_1$-$C_{12}$ hydrocarbon group having an epoxy group; $R^1$ represents $C_1$-$C_6$ alkyl, $C_1$-$C_6$ alkenyl or aryl group; $R^2$ represents $C_1$-$C_8$ alkyl, $C_1$-$C_8$ alkoxyalkyl, acyl or phenyl group; a represents 0 or 1) In order to reduce the polymerization shrinkage and to eliminate the necessity of using a solvent, partial polycondensation products of the epoxy resin may also be employed. In order to promote the ease of application of the composition, various additives may be added to the composition. For improving the flow characteristics, especially for increasing the viscosity, fine particles of inorganic oxides such as anhydrous silica, titanium oxide, antimony oxide and alumina are preferred. For the purpose of giving transparency, these fine particles of inorganic oxides in dispersed colloidal state may preferably be used.

Such a coating layer may also be provided between the particles 16 and the electro-conductive membrane 22 to give not only a better durability but also a higher transparency.

The embodiment shown in FIG. 3 further comprises a fixing frame 32 interposed between the particles 16 and the electro-conductive membrane 22. The fixing frame 32 may be an insulative double-sized adhesive tape or any other adhesive insulation film. The fixing frame 32 serves to keep the distance between the electro-conductive membranes 22 and 22 constant, and to prevent the mutual shifting thereof.

Figure 4:
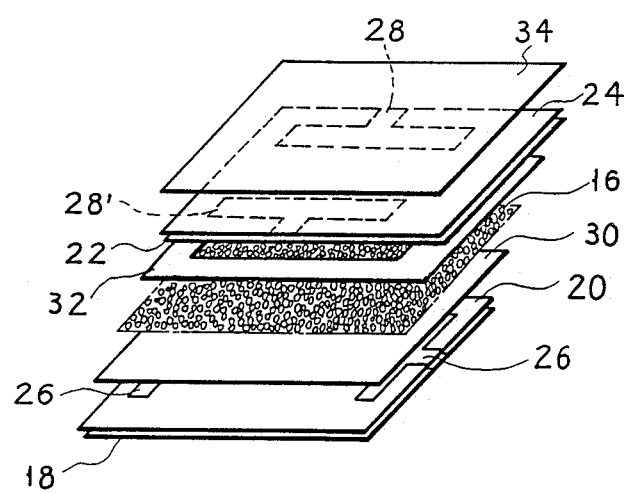
FIG. 4 is a schematic exploded perspective view of a pressure-sensitive tablet of still another preferred embodiment of the present invention.

According to a preferred embodiment of the present invention, the base film 24 has UV light-cutoff property, or, as shown in FIG. 4, a separate UV light-cutoff film 34 is laminated on the base film 24. Films with UV light-cutoff property are well-known in the art. Any of these films may be employed, so that films with either UV light-absorbing property or UV light-reflection property may be used. Examples of the UV light-absorbers contained in such films include fine particles of inorganic materials such as titanium oxide and antimony oxide, as well as organic UV absorbers such as benzotriazole-based, oxalic acid anilide-based, hindered amine-based and benzophenone-based UV absorbers. In view of the uniform distribution in the film and in view of the transparency, organic UV absorbers are preferred. Among these, those represented by the following formulae [I] and [II] are especially preferred because they have a high melting point and problems presented by the decomposition or sublimation of the compounds are substantially eliminated.

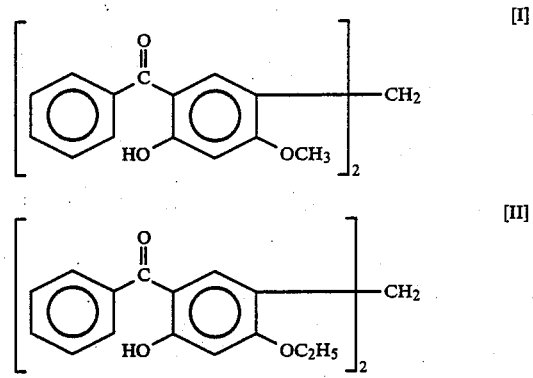

The content of the UV light absorbers in the film is preferably at least 0.1% by weight, more preferably at least 0.3% by weight in view of the effectiveness of the UV absorbers. However, the content of the UV absorbers is preferably not more than 5% by weight, more preferably not more than 4% by weight. It is preferred that the UV light-cutoff film can cut at least 70% of the UV light impinging. The thickness of the film with UV cutoff property may appropriately be selected. Films with a prominent UV light-cutoff property usually have a thickness of 20 μm to 200 μm.

In order to prevent the damage of the base film 24 in inputting operation with a pen or the like, and to promote the slipping of the film, it is preferred that at least the outer surface of the base film 24 (or the UV light-cutoff film 34 if applicable), preferably both sides of the film are subjected to hard-coat treatment. The hard-coat treatment is well-known in the art. Hard-coat layers having no glare may preferably be employed.

The pressure-sensitive tablet of the present invention has the same use as the conventional pressure-sensitive tablet. Further, the transparent tablet has various new uses. For example, placing the tablet on a road map, the shape of the road to the destination can be inputted into a computer of a car. Placing the tablet on a planar display, the figure now memorized in a computer may be corrected, or additional information may be added and transferred. Further, the tablet may be overlaid on a display which asks some questions, and the answer to the questions may be given by directly touching the display via the tablet.

[EXAMPLES]

The present invention will now be described in more detail by way of examples thereof. The examples are presented for the illustration purpose only and should not be interpreted in any restrictive way.

EXAMPLE 1

On an antimony doping tin oxide coating glass substrate sizing 18.2 cm × 25.7 cm (B5 size) having a surface resistance of 100 Ω/□, 0.2% by weight dispersion in freon of an epoxy-based spherical particle adhesive having a deformability (D) of 25% and having an average particle size of 7 μm was applied using a spin coater at 300 rpm for 30 seconds. The particle adhesive was heat-cured in a drier at 130° C. for 1 hour to adhere the particles to the glass.

The dispersion state of the particle adhesive was observed using a microscope. The population density was 22,000 particles/cm² and the particles-substrate area ratio was $8.5 \times 10^{-3}$.

The glass substrate with the particles was covered with an electro-conductive film having a surface resistance of 500 $\Omega/\square$, and the periphery of the thus formed laminated structure was adhered via a double-sided adhesive tape to obtain a pressure-sensitive tablet.

The light transmission of this tablet was about 76% and the tablet looked transparent. Placing this tablet on a cathod ray tube display did not change the image of the display.

The performance of this tablet was tested using a inputting pen having a steel ball of 2 mm diameter at its tip. Using this pen, the upper surface of the electro-conductive film was pressed. When the pen was at rest, the pressed point became electro-conductive at a load of 50 grams. When the pen was moving, the line written by the pen became electro-conductive at a load of 100 grams and at a moving speed of 2 cm/sec. The conductivity obtained by pressing the film with the pen was equal at any point of the film. Further, the analogue processing of the image signal was attained.

No point of the tablet became electro-conductive when pressed with a finger or fist.

The durability of the pressure-sensitive tablet was tested by repeating the input with the pen. After 10,000 cycles of repetition of input with the pen at a load of 200 grams, no change was observed on the electro-conductive performance.

EXAMPLE 2

The same procedure as in Example 1 was repeated except that silica-based spherical particles with a deformability of 0% were mixed with the epoxy-based particle adhesive at a weight ratio of 1:1 to obtain a pressure-sensitive tablet.

The dispersion state of the particles was observed using a microscope. The population density was 48,000 particles/cm² and the particles-substrate area ratio was $5.5 \times 10^{-3}$.

The tablet showed excellent electro-conductive performance when pressed with the pen as in Example 1, but no point of the tablet became electro-conductive when pressed with a finger or fist as in Example 1.

After 1,000 cycles of repetition of input with the pen at a load of 200 grams, no change was observed on the electro-conductive performance.

EXAMPLE 3

The same procedure as in Example 1 was repeated except that an epoxy-based particle adhesive with an average particle size of 12 μm was employed to obtain a pressure-sensitive tablet.

The dispersion state of the particles was observed using a microscope. The population density was 5,500 particles/cm² and the particles-substrate area ratio was $6.0 \times 10^{-3}$.

The tablet showed excellent electro-conductive performance when pressed with the pen as in Example 1, but no point of the tablet became electro-conductive when pressed with a finger or fist as in Example 1.

EXAMPLE 4

On the same glass substrate as in Example 1 having a surface resistant of 100 $\Omega/\square$, 0.1% by weight dispersion in freon of an epoxy-based spherical particle adhesive having a deformability (D) of 30% and having an average particle size of 25 μm was applied using a spin coater at 300 rpm for 30 seconds. The particle adhesive was heat-cured in a drier at 130° C. for 1 hour to adhere the particles to the glass.

The dispersion state of the particle adhesive was observed using a microscope. The population density was 300 particles/cm² and the particles-substrate area ratio was $2.0 \times 10^{-3}$.

The glass substrate with the particles was covered with an electro-conductive film having a surface resistance of 100 $\Omega/\square$, and the periphery of the thus formed laminated structure was adhered via a double-sided adhesive tape to obtain a pressure-sensitive tablet.

The light transmittance of the tablet was about 75%.

The performance of this tablet was tested using a ball point pen having a steel ball of 0.5 mm diameter at its tip. Using this pen, the upper surface of the electro-conductive film was pressed. When the pen was at rest, the pressed point became electro-conductive at a load of 30 grams. When the pen was moving, the line written by the pen became electro-conductive at a load of 70 grams and at a moving speed of 2 cm/sec. The conductivity obtained by pressing the film with the pen was equal at any point of the film.

No point of the tablet became electro-conductive when pressed with a finger or fist.

The durability of the pressure-sensitive tablet was tested by repeating the input with the pen. After 50,000 cycles of repetition of input with the pen at a load of 200 grams, no change was observed on the electro-conductive performance.

After this durability test, the tablet was disassembled and the damage of the electro-conductive film and the electro-conductive glass substrate was observed. No damage was observed and the change of the resistance was within 2%. The particles substantially retained their spherical shape.

EXAMPLE 5

The same procedure as in Example 4 was repeated except that the epoxy-based particle adhesive had an average particle size of 40 μm to obtain a pressure-sensitive tablet.

The dispersion state of the particles was observed using a microscope. The population density was 20 particles/cm² and the particles-substrate area ratio was $2.5 \times 10^{-4}$.

Input was able to be conducted by pressing the film either with a ball-point pen or with a finger.

The tablet had an excellent transparency and the particles could not be seen unlike in the case of dot-matrix type tablet.

EXAMPLE 6

The same procedure as in Example 4 was repeated except that particle containing 70% by weight of epoxy resin component and 30% by weight of an acrylic rubber component which has a deformability of 40% and having an average particle size of 25 μm was employed in place of the epoxy-based particle adhesive to obtain a pressure-sensitive tablet.

Input was able to be conducted by pressing the film either with a ball point pen or with a finger, but touching with fist did not make the point electro-conductive.

The durability of the pressure-sensitive tablet was tested by repeating the input with the pen. After 200,000 cycles of repetition of input with the pen tat a load of 200 grams, no change was observed on the electro-conductive performance.

EXAMPLE 7

The same procedure as in Example 4 was repeated except that a polyester-based particle adhesive having a deformability of 45% and having an average particle size of 25 μm was employed in place of the epoxy-based particle adhesion to obtain a pressure-sensitive tablet.

Input was able to be conducted by pressing the film either with a ball-point pen or with a finger, but touching with fist did not make the point electro-conductive.

The durability of the pressure-sensitive tablet was tested by repeating the input with the pen. After 100,000 cycles of repetition of input with the pen at a load of 200 grams, no change was observed on the electro-conductive performance.

After this durability test, the tablet was disassembled and the damage of the electro-conductive film and the electro-conductive glass substrate was observed to obtain the same excellent results as in Example 4.

EXAMPLE 8

On the electro-conductive film of the tablet produced in Example 1, a film with a thickness of 125 μm having a UV light-cutoff property (commercially available from Toray Industries Inc., Tokyo, Japan under the trade name of "Q-37") was laminated to obtain a pressure-sensitive tablet.

The tablet was placed near a window under the sunlight for 4 hours. The change in resistance before and after the exposure to the sunlight was determined. Further, the average exposure intensity to the UV light was measured at the surface of the electro-conductive film using a UV light illumination intensity meter (commercially available from Oak Mfg. Co., Ltd. under the trade name of "UV-302A"). The average exposure intensity was 0.01–0.05 mW/cm$^2$ and the change in the resistance of the electro-conductive film was less than 0.1%.

For comparison, the same test was conducted for the tablet which does not have the UV light-cutoff film. The average exposure intensity was 0.15–0.50 mW/cm$^2$ and the change in the resistance of the electro-conductive film was 1.3%.

EXAMPLE 9

On the same glass substrate used in Example 1, a solution (solid content of 30% by weight) in phenetyl alcohol containing 70 parts by weight of indium oxide/tin oxide particles as the electro-conductive particles and 30 parts by weight of a hydrolysate of organic silicon compound as a vehicle was applied using a spin coater. The applied solution was subjected to heat-curing at 80° C. for 12 minutes and then 130° C. for 2.0 hours. The thickness of the coating was 1.0 μm (measured in accordance with JIS B0651). Using the thus obtained coated electro-conductive glass substrate, the same procedure as in Example 1 was repeated to obtain a pressure-sensitive tablet.

The tablet showed excellent electro-conductive performance as in Example 1, and pressing the film with a finger or palm did not make the point electro-conductive.

The durability of the pressure-sensitive tablet was tested by repeating the input with the pen. After 10,000 cycles of repetition of input with the pen at a load of 200 grams, no change was observed on the electro-conductive performance.

The light transmittance of the pressure-sensitive tablet was 73%.

COMPARATIVE EXAMPLE 1

A pressure-sensitive tablet of the dot-matrix type was prepared. The spacer layer comprised cylindrical particles with 0.15 mm diameter distributed at 5 mm intervals, and the particles-substrate area ratio was $7 \times 10^{-4}$. The spacer layer was clearly seen from the outside and so the tablet was bad-looking. Input was able to be conducted by pressing the film with a ball point pen, finger or fist, so that the erroneous input was likely to occur. Further, the input at the point on a spacer particle or the vicinity thereof was not accurate.

COMPARATIVE EXAMPLE 2

The same procedure as in Example 1 was repeated except that the epoxy-based particle adhesive was not employed to obtain a tablet.

Pressing the film with an inputting pen made the point electro-conductive, but the point remained to be electro-conductive even after displacing the pen from the film. Further, pressing the film with a finger or palm made the pressed point electro-conductive.

COMPARATIVE EXAMPLE 3

The same procedure as in Example 1 was repeated except that silica-based spherical particles having a deformability of 0% and having an average particle size of 2.0 μm were employed in place of the epoxy-based adhesive particles to obtain a pressure-sensitive tablet.

Pressing the film with the inputting pen made the pressed point electro-conductive, but pressing the film with a finger or palm did not make the pressed point electro-conductive.

However, in the durability test, the electro-conductive performance was degraded after 2,000 cycles of repetition of inputting with a load of 200 grams.

After the durability test, this tablet was disassembled and the conditions of the electro-conductive film and the substrate were observed. The electro-conductive film was clearly damaged. Further, the resistance was changed by about 4%.

Although the invention was described based on a specific preferred embodiment thereof, it is apparent for those skilled in the art that various modifications may be made without departing the spirit and scope of the invention.

We claim:

1. A pressure-sensitive tablet comprising:
   an electro-conductive substrate;
   deformable insulative particles with an average particle size of 0.1 μm to 100 μm, distributed on the substrate, said deformable particles being made of a resin with a deformability of not less than 10%, said deformability being expressed by the following formula:

$$D (\%) = \frac{(L_0 - L)}{L_0} \times 100$$

wherein D represents the deformability of the resin constituting the particles, $L_0$ is the thickness of a block made of the resin when no pressure is applied to the block, and L is the thickness of the block to which a pressure of 20 kg/cm$^2$ is applied; and an electro-conductive film superimposed on the deformable particles.

2. The pressure-sensitive tablet of claim 1, wherein the particles are substantially spherical.

3. The pressure-sensitive tablet of claim 2, wherein each of the particles is fixed to the electro-conductive substrate substantially at a single point.

4. The pressure-sensitive tablet of claim 1, wherein the electro-conductive film comprises a base film and an electro-conductive membrane formed on the base film, the electro-conductive membrane facing the deformable particles.

5. The pressure-sensitive tablet of claim 1, wherein the outer surface of the electro-conductive film is hard-coat treated.

6. The pressure-sensitive tablet of claim 1, wherein the electro-conductive substrate comprises a base substrate and an electro-conductive membrane formed on the base substrate, the electro-conductive membrane facing the deformable particles.

7. The pressure-sensitive tablet of claim 1, wherein the deformable particles have a particles-substrate area ratio of $1 \times 10^{-4}$ to $15 \times 10^{-3}$ and have a population density of 2 to 50,000 per cm$^2$.

8. The pressure-sensitive tablet of claim 1, wherein the average diameter of the deformable particles is 1.5–40 μm, the deformable particles have a particles-substrate area ratio of $2 \times 10^{-3}$ to $15 \times 10^{-3}$ and have a population density of 4,100 to 50,000 per cm$^2$.

9. The pressure-sensitive tablet of claim 1, wherein the average diameter of the deformable particles is 7.0–100 μm, the deformable particles have a particles-substrate area ratio of $0.5 \times 10^{-3}$ to $6.5 \times 10^{-3}$ and have a population density of 200 to 4,000 per cm$^2$.

10. The pressure-sensitive tablet of claim 1, wherein the average diameter of the deformable particles is 1.0–50 μm, the deformable particles have a particles-substrate area ratio of $1 \times 10^{-4}$ to $10 \times 10^{-3}$ and have a population density of 2 to 200 per cm$^2$.

11. The pressure-sensitive tablet of claim 1 wherein the electro-conductive film has a surface resistance of $1 \times 10^0 - 5 \times 10^3$ Ω☐.

12. The pressure-sensitive tablet of claim 1, wherein the electro-conductive substrate has a surface resistance of $1 \times 10^0 - 5 \times 10^3$ Ω☐.

13. The pressure-sensitive tablet of claim 1, wherein the electro-conductive film and the electro-conductive substrate arc substantially transparent.

14. The pressure-sensitive tablet of claim 1, wherein the deformable particles are made of an epoxy resin or a polyester resin.

15. The pressure-sensitive tablet of claim 1, wherein the deformable particles consists essentially of 30–95% by weight of a thermoset resin component and 5–70% by weight of a rubber component.

16. The pressure-sensitive tablet of claim 15, wherein the thermoset resin is a phenol resin or an epoxy resin.

17. The pressure-sensitive tablet of claim 1, wherein the electro-conductive film has an UV light-cutoff property.

18. The pressure-sensitive tablet of claim 1, further comprising an UV light-cutoff layer formed on the electro-conductive film.

* * * * *